July 21, 1970 G. TONGURIAN 3,521,346
MACHINE FOR RECONDITIONING AND SETTING UP
CLUTCHES OF MOTOR VEHICLES AND THE LIKE
Filed May 31, 1967 3 Sheets-Sheet 1

Inventor
Grigore Tongurian
By Michael S Striker
Attorney 3,521,346
Patented July 21, 1970

1

3,521,346
MACHINE FOR RECONDITIONING AND SETTING UP CLUTCHES OF MOTOR VEHICLES AND THE LIKE
Grigore Tongurian, Rozelle, New South Wales, Australia, assignor to British Automotive Industries, Pty. Limited, Belmore, New South Wales, Australia, a corporation of Australia
Filed May 31, 1967, Ser. No. 642,434
Int. Cl. B23p 19/00
U.S. Cl. 29—200                                     14 Claims

ABSTRACT OF THE DISCLOSURE

A machine for reconditioning and setting up clutches of motor vehicles and the like comprises a face plate simulating the flywheel of a motor engine and mounted for rotation in or on the face of a fixed table with supporting means, a series of clamping members each separately mounted through a radial slot in said face plate at intervals apart in a circular path and extending at the lower end to a carrier member positioned under said face plate, said clamping members having positioning means for advancing them in and moving them out to a required position on the said face plate and such means being operated manually from a single location at a convenient sideward location of the machine, air pressure operated means for raising and lowering said clamping members in unison with their carrier member from a common actuating position, an arm device pivotally or hingedly mounted from one side of said table for movement radially over the face plate and having air pressure actuated means housed in or on said arm device and linked to means at the outer end for actuating the clutch fingers of a clutch assembly being reconditioned, said arm device having at its outer end means to receive an indicating gauge to check variations of the said clutch fingers when said face plate is rotated, and means for connecting said air pressure operated means and said air pressure actuated means to a supply of air under pressure.

---

This invention relates to a machine including apparatus or jigs for rebuilding, that is reconditioning clutches of motor vehicles and the like, and for assembling, and also setting up the release levers of the pressure plate assemblies of such clutches.

The invention has been devised to provide a novel form of machine for reconditioning and setting up clutches of motor vehicles and the like, wherein the movements and setting of the integers are mechanised, so that adjustments and the clamping-up, checking and the like operations can be effected more easily than heretofore, and ensuring close accuracy in such setting as well as saving in time and effort in operations. The machine can readily be constructed, and is both strong and durable in form and simple to operate and reliable in use. Other advantages will be apparent from the following description.

In some forms of the machine the face plate has a centrally mounted post upstanding therefrom and formed for effecting the approximate setting of the release levers of a clutch assembly being attended to.

The air pressure operated means for raising and lowering the carrier member with the clamping members may consist of a plunger or piston device arranged under the table and operating the clamping members and the said carrier member.

In some cases the air pressure operated means for raising and lowering the carrier member with the clamping members may be formed so as to provide for more

2 than one clamping power or pressure, say two in the working movement of the stated parts.

In order to describe the invention more fully reference will now be made to the accompanying drawings, wherein.

Figure 1:
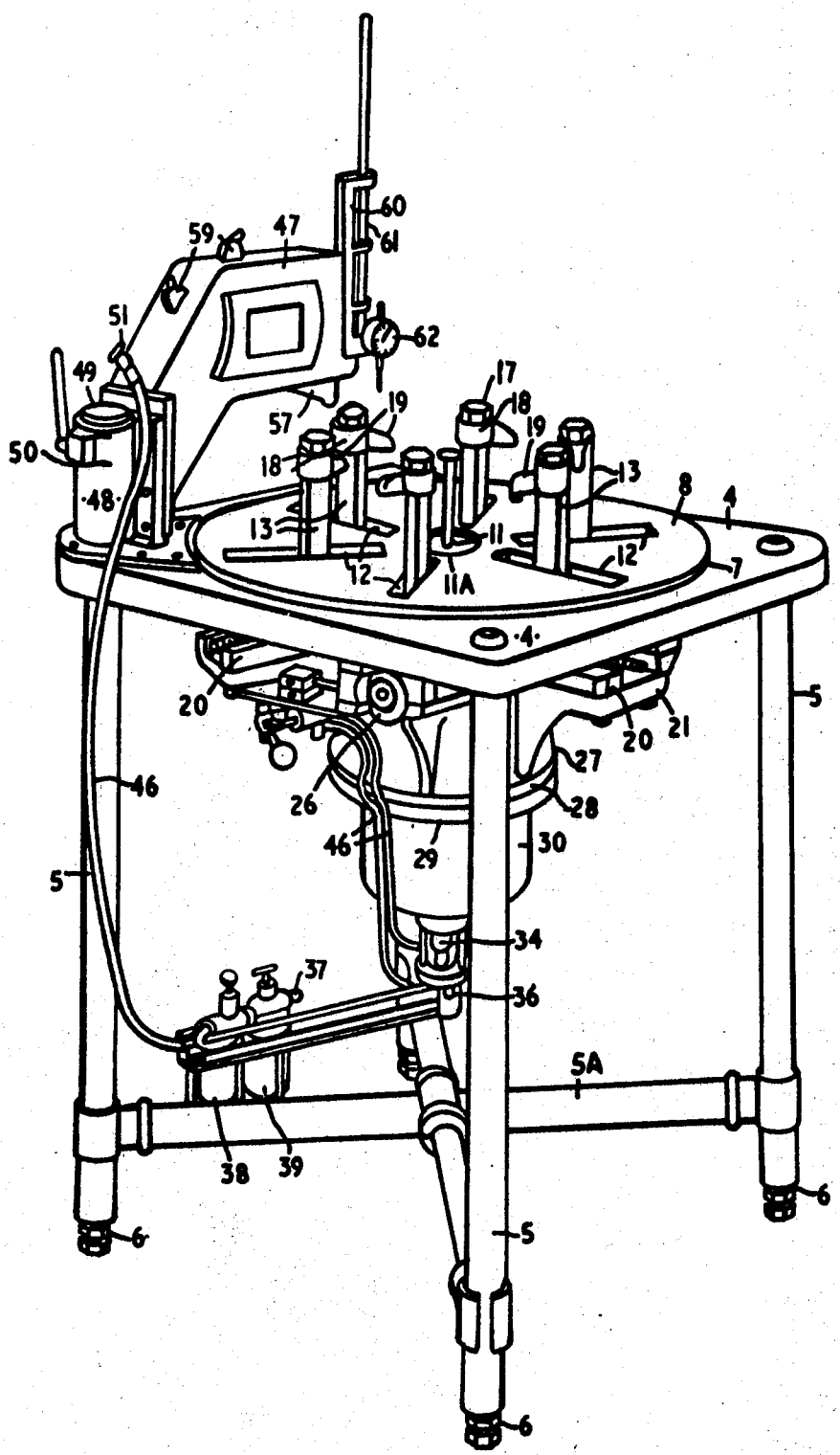
FIG. 1 is a perspective view of a preferred embodiment of the machine subject of the invention taken from the top at that portion which is normally the front of the said machine showing the general arrangement of the various parts which can be seen from the viewpoint.

The table 4 is of flat faced form supported at a suitable height upon legs 5 preferably having provision at the lower end at 6 for adjusting the level of said table. Said table 4 has a circular opening 7 therein in which the face place 8 is mounted in a freely rotatable manner but located as to level by means of an overhung rim edge 9 extending above a rim channel (indicated at 10 in FIG. 2) of the said table 4 and a number of steel balls are positioned in said channel 10 and the face plate 8 seats thereon by its rim edge 9 and the arrangement provides an efficient rotatable means of mounting of the said face plate 8.

Returning to the legs 5, these are securely connected together near the lower ends by tubular cross members radiating from a common central location and fitted with end clamp fittings and this structure is indicated generally by the reference numeral 5A.

Figure 2:
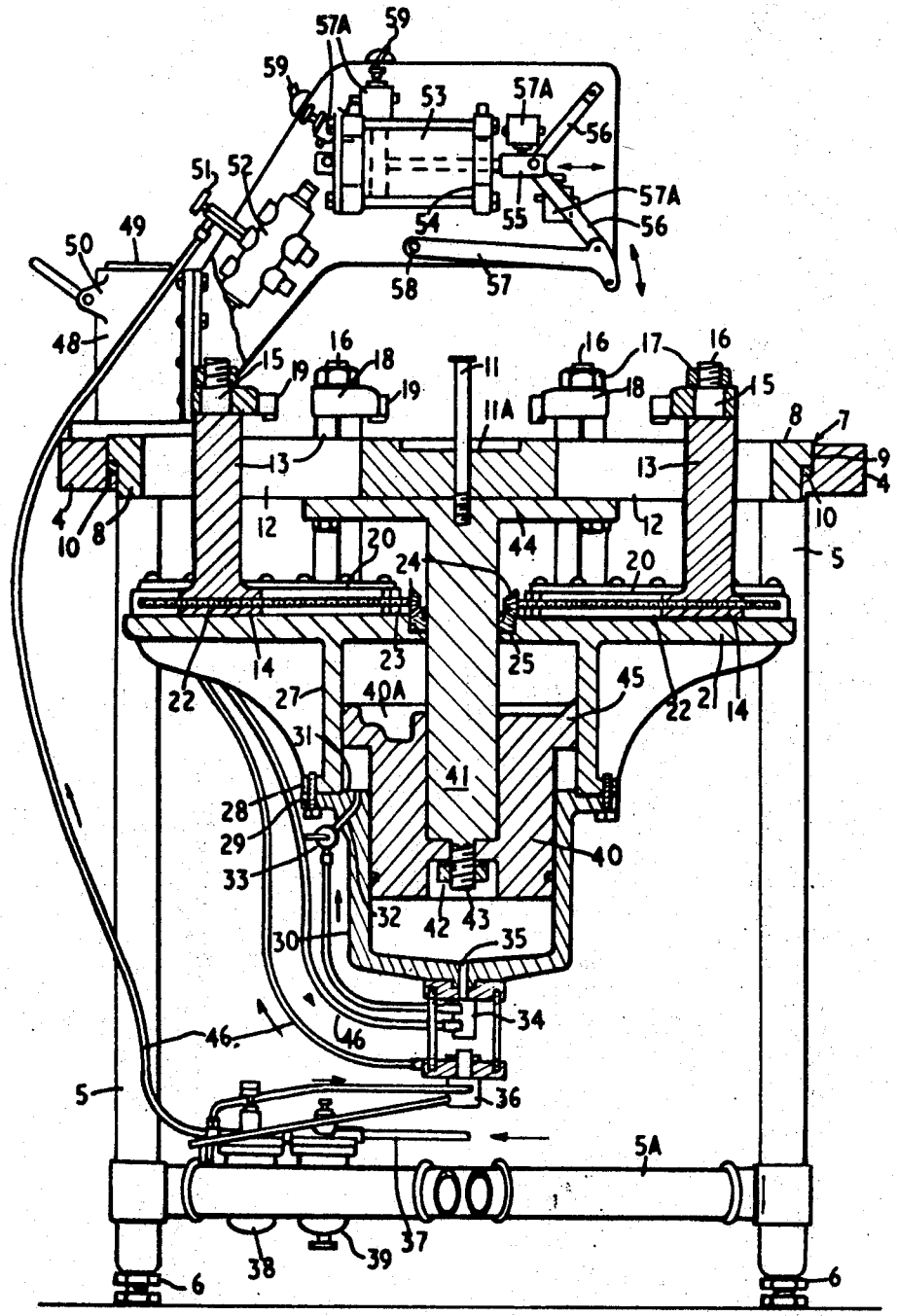
FIG. 2 is a front sectional elevation of the machine sectioned through its centre point showing the column moving mechanisms and fluid pressure cylinder means and circuits and also including the actuating arm with the front plate out away to disclose the interior parts and for clarity the dial indicator and mounting parts have been omitted.

The face plate 8 of disc form simulating the flywheel of a motor engine, when mounted in place has its top face positioned a short distance above the top surface of the table 4 as seen in FIG. 1 and 2, and there is a fixed post 11 upstanding from the top and this will be later more fully explained as to its purpose, and a series of radially and evenly spaced slots 12 extend right through said face plate 8 from a position near the centre to adjacent the plate rim and in this example the slots 12 are six in number but no limitation is intended in this respect as the number may depend on requirements.

The post 11 before referred to forms what may be termed a preliminary setting post and is headed and has a transverse slot (not shown) or other formation therein extending from the top and adapted to receive a graduated scale rule or the like to effect the rough setting of the height of the release levers of a clutch assembly and also serves as a guide for the clutch assembly parts such as the clutch fingers which are worked up and down by a certain integer of the radial arm device of the machine later herein described. A clearance recess 11A is also provided in the face plate 8 about the base of the post 11 to furnish clearance for protrusions at the middle portion of a clutch plate if such plate is used under the pressure plate instead of interposed thickness gauges which can be used to compensate for the thickness of the driven plate of a clutch assembly.

The clamping members 13 are of bar-like form arranged to pass through and slide along the slots 12 in a neatly fitting manner and each have a lower foot 14 through which a threaded hole passes and will be later more fully described, while the top end has a circular stem 15 above which there is a screwed extremity 16 adapted to receive a clamping nut 17. On the stems 15 clamping fingers 18 are rotatably fitted and have extensions 19 suitably shaped for their purpose. Said clamp members 13 are arranged in a circular path about the face plate 8 and at their lower end are each slidable at opposite sides in guides 20 radially positioned to suit the disposal of the slots 12 and secured by known fastening devices to a carrier member 21 later more fully described.

The clamping fingers 18 previously referred to herein may be made in different interchangeable forms adapted to be fitted in place in the manner before described and clamped in position by the nuts 17 and are arranged to accommodate various shapes of covers of clutch assemblies apart from the form of such clamping fingers 18 shown in the drawings. More specifically, the clamping fingers 18 are provided to engage portions of the cover of a clutch assembly being tested to clamp it firmly to the face plate 8 during the testing operation.

Figure 3:
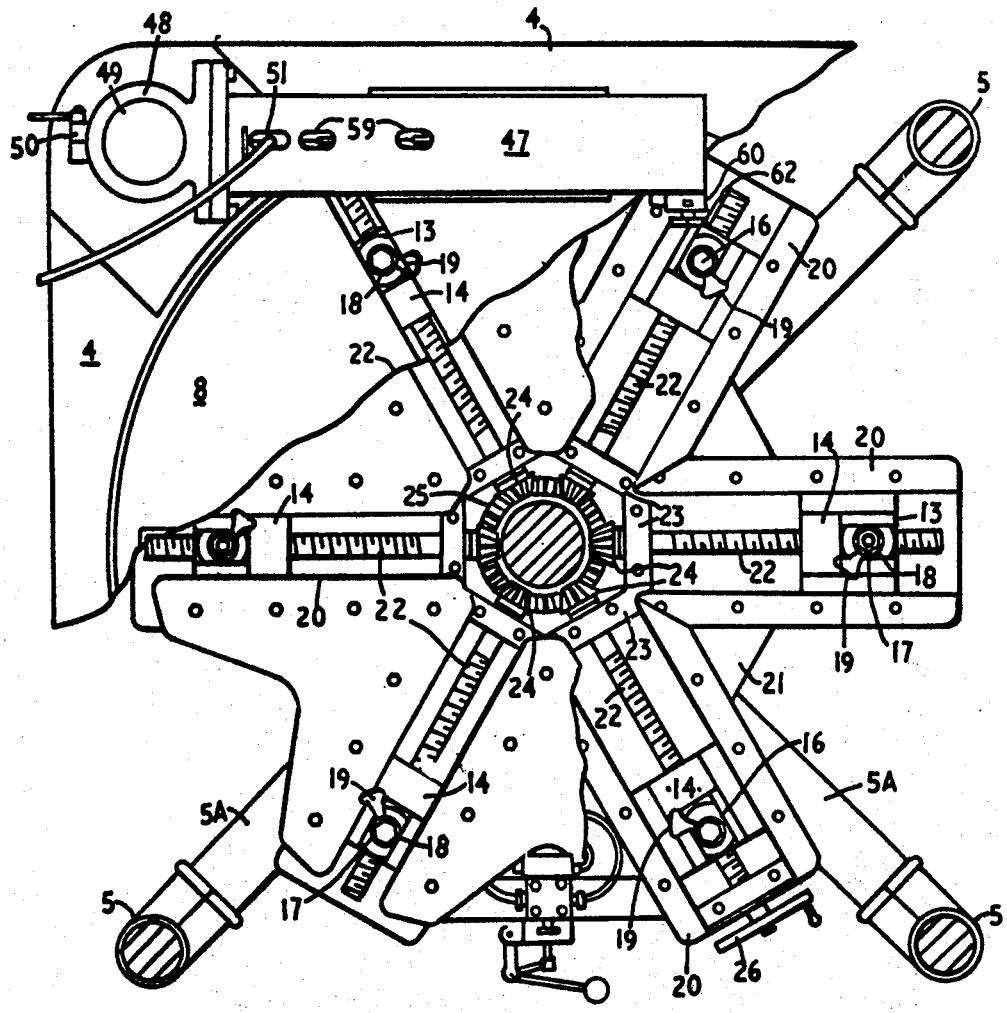
FIG. 3 is a plan view with portions of the table and face plate cut away so as to show the clamping column gearing and spindle driving mechanism.

The threaded holes in the feet 14 of the clamping members 13 are each engaged by a threaded lead screw 22 which has bearing at the inner end in bearing bracket 23 and beyond these brackets 23 each lead screw 22 has a bevel pinion 24 thereon meshing with a bevel crown wheel 25 as seen in FIGS. 2 and 3 and such crown wheel 25 is mounted for free rotation in similar manner to that described with reference to the mounting of the face plate 8, that is on steel balls on the carrier member 21 in a recess therein (see FIG. 2).

The above described arrangement of the lead screws 22 is such that the bevel pinions 24 act in the manner of planetary pinions except that while they are fixed as to location, when one is rotated the engagement with the rotatably free crown wheel 25 transmits the rotary action to all the said pinions 24 of the series so that all the clamping members 13 move in or out together. One lead screw 22 such as that which is located at a position which is normally at the front of the machine is extended outwardly beyond the face plate 8 and provided with an operating turn handle 26 (or other suitable means of actuation) so that by the operation of such handle 26 all the other lead screws 22 revolved and their related clamping members 13 are simultaneously moved inwardly or outwardly according to the direction of rotation of the said handle 26 and thereby provide for an easy and accurate method of adjustment of said members 13 at a required setting.

The carrier member 21 has a depending centrally positioned upper cylinder 27 forming part of the air pressure actuating means for raising and lowering the said carrier member 21 and the parts mounted thereon, and said cylinder has an outturned foot flange 28 by which it is secured to a second flange 29 by screws (as seen in FIG. 2) to a lower cylinder 30 of the assembly, closed at the bottom end of smaller diameter than the upper cylinder 27. This smaller cylinder 30 intrudes at its top end into the upper cylinder 27 forming a ledge 31 surrounding same, and there is a passage 32 connecting to the top of ledge 31 from an operating valve 33 linked to a second valve 34 where there is a centrally disposed passage 35 and the air line connected to a main valve 36 of rotation form. This rotating valve 36 is one of known form and connected with the main air pressure supply line 37 having a mist type lubricating device 38 and filter 39 all of known form interposed in the circuit. The air pressure pipe connections and actuating means may be in accordance with known practice for such purpose of operation and control of the before described integers.

The top of the upper cylinder 27 has a relief or outlet passage (not shown) leading through the body of the casting of the carrier member 21 and connecting to said cylinder 27 to prevent any pressure build-up above the piston of the air pressure actuating means now about to be further described. This relief passage is valve controlled in any suitable known manner and operable from the valve means included in the line circuit.

The piston 40 is fixed on a shaft 41 by washered nut 42 on a stud end 43 as seen in FIG. 2 and the top end of said shaft passes through an orifice in the carrier member 21 and has its top end flanged outwardly at 44 and affixed by screws or the like to the underside of the face plate 8. Said piston 40 has its lower portion diametered to slidably fit in the lower and smaller cylinder 30 and the top end is sidewardly enlarged at 45 beyond the lower portion to slidably fit in the upper cylinder 27 and both cylinder parts are provided with sealing means on the peripheral surface, such as by rings or means of other known form. The top of said piston 40 is recessed at 40A to reduce the weight as will be seen in FIG. 2.

In the above described construction of the piston means the provision of the two diameters provides for two ranges of clamping power either of which can be selected for use by the valve operating means, and release effected by such means. This diametrical variation of clamping power is for economising in the use of the actuating compressed air, in that the lower cylinder 40 may be utilised where necessary to provide the clamping power and only on particular occasions the greater clamping pressure utilised.

The pipe lines generally indicated by the reference number 46 shown in the drawings linking the various valve means and operating points are arranged to suit the requirements of the machine and are of suitable flexible tubing such as plastic tubing and such lines have provision for bleeding the circuit so that same can be cleared out before operation of the machine and any tendency for air locks to develop eliminated.

The radial arm device 47 of the machine is of hollow casing form having one or more side inspection and adjustment plates and is provided with a boss 48 at its back end whereby it is pivotally mounted on a fixed column 49 on the table 4 and a clamp 50 is provided for locking a radial setting of said arm device 47.

This radial arm device 47 has therein a needle valve 51 to regulate the air supply and speed of actuation and is linked by a pipe line 46 as shown in FIG. 2, and said needle valve 51 connects with a pilot valve 52 connected to a clutch finger actuator generally indicated by reference numeral 53 of double acting air cylinder form having a piston for imparting movement to the release levers of a clutch assembly being attended to, and the spindle 54 of the finger actuator 53 is connected to an articulated exterior end 55 to which toggle levers 56 are linked. Poppet valves 57A are provided for effecting the operation of the actuator 53. The upper toggle lever 56 of the toggle arrangement is fulcrummed at its outer end to the casing of the arm device 47, while the other toggle lever is pivoted to a clutch finger actuating lever 57 which has its outer end suitably shaped for its purpose and provided with a roller for imparting movement to the release levers of a clutch assembly, and said finger actuating lever 57 extends rearwardly in the arm device 47 and is fulcrummed at 58 therein.

The two front poppet valves 57A are for effecting the automatic reciprocation of the piston of the air cylinder 53 while the other and rear two poppet valves 57A are arranged to effect the stopping of the reciprocating motion of the piston of the air cylinder 53 while the release fingers of the clutch assembly are compressed down, or by using such poppet valves to stop the motion when the finger actuating lever 57 is in an elevated position as the release levers of the clutch assembly are in an upward position also. The release of the two rear poppet valves is effected by finger buttons 59 as seen in FIGS. 1 and 2.

The outer end of the radial arm device 47 has a lugged bracket 60 affixed thereto in which a rod 61 is mounted for slidable vertical movement and is adapted to receive a surface gauge 62 as seen in FIG. 1 for effecting the final adjustment of the height of the release levers of the clutch assembly being attended to.

I claim:

1. A machine for reconditioning and setting-up clutches of motor vehicles and the like, comprising a face plate simulating the flywheel of a motor engine and mounted for rotation in or on the face of a fixed table with supporting means, a series of clamping members each separately mounted through a radial slot in said face plate at intervals apart in a circular path and extending at the lower end to a carrier member positioned under said face plate, said clamping members having positioning means for advancing them in and moving them out to a required position on the said face plate and such means being operated manually from a single location at a convenient sideward location of the machine, air pressure operated means for raising and lowering said clamping members in unison with their carrier member from a common actuating position, an arm device pivotally or hingedly mounted from one side of said table for movement radially over the said face plate and having air pressure actuated means housed in or on said arm device and linked to means at the outer end for actuating the clutch fingers of a clutch assembly being reconditioned, said arm device having at its outer end means to receive an indicating gauge to check variations of the said clutch fingers when said face plate is rotated and means for connecting said air pressure operated means and said air pressure actuated means to a supply of air under pressure.

2. A machine for reconditioning and setting-up clutches of motor vehicles and the like, according to claim 1, wherein the face plate is mounted in a circular orifice in the table in a freely rotatable manner by a series of steel balls arranged in a channel in the said orifice upon which balls a peripheral formation on said face plate seats.

3. A machine for reconditioning and setting-up clutches of motor vehicles and the like according to claim 1, wherein the face plate has a centrally mounted post or spindle upstanding therefrom, and formed for receiving a graduated rule or the like for effecting the approximate setting of the release levers of a clutch assembly.

4. A machine for reconditioning and setting-up clutches of motor vehicles and the like according to claim 3, wherein a clearance recess is provided in the top surface of the face plate surrounding the post or spindle.

5. A machine for reconditioning and setting-up clutches of motor vehicles and the like according to claim 1, wherein the clamping members are of bar-like form arranged to pass through and slide along their respective slots in the face plate and extending thereunder and each being provided at the lower end with a foot having a threaded orifice passing therethrough, and the top end having a screwed extremity adapted to receive a clamping nut thereon, and said extremities each having a clutch clamping finger rotatably fitted thereon and locked at a setting by the related nut, and the outer end of each clamping finger being shaped for its clamping purpose.

6. A machine for reconditioning and setting-up clutches of motor vehicles and the like according to claim 5, wherein the front of each clamping member is slidably fitted in a radially positioned guide in or on a carrier plate or member arranged under the face plate and rotating therewith, and the threaded orifice of each member foot being engaged by a lead screw constituting positioning means for the clamping members arranged on the carrier member.

7. A machine for reconditioning and setting-up clutches of motor vehicles and the like according to claim 6, wherein the lead screws for the clamping members are arranged in radial position each in register with a related slot in the face plate and each lead having its inner end portions fitted in a bearing in or on the carrier member, and a bevel pinion on the inner extremity meshing with a ring-like crown wheel fitted in a freely rotatable manner in a central recess in the said carrier member, and one lead screw of the series being extended at its outer or front end and provided with manually operable means whereby such lead screw is rotated and the turning movement transmitted through the said crown wheel to the meshed pinions so that as same are rotated the related clamping members are simultaneously moved inwardly or outwardly to adjust the position thereof.

8. A machine for reconditioning and setting-up clutches of motor vehicles and the like according to claim 1, wherein the air pressure operated or actuating means for raising and lowering said clamping members and the carrier member consist of an air cylinder unit centrally affixed to the underside of the carrier member and having operative connection to an air pressure supply and means for supplying and releasing such air pressure, said cylinder containing a fixed piston secured to a shaft or the like depending centrally from the underside of the face plate, and said cylinder unit sliding over said piston as the carrier member with its parts is raised or lowered.

9. A machine for reconditioning and setting-up clutches of motor vehicles and the like according to claim 8, wherein the cylinder unit is formed in two cylinder parts or sections, the upper section being of greater diameter than the lower cylinder, and the piston being formed in two diametrical sizes each complementary to the related cylinder section, and air pressure supply and release means connected to each cylinder section so as to operate separately the respective cylinder sections and thereby obtain two clamping powers or pressures for individual application to the carrier member and its clamping members affixed thereto.

10. A machine for reconditioning and setting-up clutches of motor vehicles and the like according to claim 9, wherein the larger and upper cylinder of the pair is affixed at its bottom end to the smaller cylinder by a flange formation and at the location of connection the top end of the smaller cylinder intrudes into the larger cylinder forming a surrounding ledge therein, and an air supply and release port leading to the top of said ledge from a control valve and air supply source, and the piston of the unit having its lower portion diametered to suit the smaller cylinder and its top end sidewardly enlarged to fit the larger and top cylinder, and an air pressure inlet and release passage connected to the bottom end of the said smaller cylinder, and a relief or outlet passage arranged through the carrier member to the top of the upper cylinder.

11. A machine for reconditioning and setting-up clutches of motor vehicles and the like, according to claim 1, wherein the radial arm device is of hollow casing form having one or more inspection and adjustment plates, and a boss at its back end whereby it is pivotally mounted on a fixed column upstanding from the table of the machine at one corner thereof and having clamping means for locking a radial setting of said arm device.

12. A machine for reconditioning and setting-up clutches of motor vehicles and the like, according to claim 11, wherein the radial arm device includes a needle valve fitment coupled to a source of air pressure supply and being linked to a pilot connected to a clutch finger actuator of double acting air cylinder form housing a piston therein with a spindle operatively arranged for imparting movement to the release levers of a clutch assembly through a clutch finger actuating lever positioned and formed for engagement with the said release levers for movement thereof in the working operations on a clutch assembly.

13. A machine for reconditioning and setting-up clutches of motor vehicles and the like according to claim 11, wherein the clutch finger actuating lever is fulcrummed at its back end within the casing of the radial arm device, and has its outer end arranged for movement up and down and protrusion beyond the underside of the said arm device for its working operation, and a toggle arrangement connecting said finger actuating lever to the spindle of the piston of the air cylinder and to a fulcrum point in said casing, and having poppet valves disposed within said casing and associated with said air cylinder for effecting the automatic reciprocation of the piston in said air cylinder and for effecting the stopping of same as required in working operations of the said finger actuating lever.

14. A machine for reconditioning and setting-up clutches of motor vehicles and the like according to claim 1, wherein the outer end of the radial arm device has a bracket or the like affixed thereto and arranged to receive means for mounting in a vertically slidable manner a surface indicator gauge for use in effecting the final adjustment of the height of the release levers of a clutch assembly.

References Cited

UNITED STATES PATENTS

| | | |
|---|---|---|
| 2,306,461 | 12/1942 | Miller. |
| 2,680,287 | 6/1954 | Wilson. |
| 2,751,669 | 6/1956 | Crumpacker et al. |
| 2,860,404 | 11/1958 | Alden. |

THOMAS H. EAGER, Primary Examiner

U.S. Cl. X.R.

29—401